US009798507B2

(12) United States Patent
Zhu

(10) Patent No.: US 9,798,507 B2
(45) Date of Patent: Oct. 24, 2017

(54) DISPLAY DEVICE AND CONTROL METHOD

(71) Applicants: HISENSE ELECTRIC CO., LTD., Qingdao, Shandong (CN); HISENSE USA CORPORATION, Suwanee, GA (US); HISENSE INTERNATIONAL CO., LTD., Qingdao, Shandong (CN)

(72) Inventor: Ke Zhu, Shandong (CN)

(73) Assignees: HISENSE ELECTRIC CO., LTD., Qingdao, Shandong (CN); HISENSE USA CORPORATION, Suwanee, GA (US); HISENSE INTERNATIONAL CO., LTD., Qingdao, Shandong (CN)

(*) Notice: Subject to any disclaimer, the term of this patent is extended or adjusted under 35 U.S.C. 154(b) by 155 days.

(21) Appl. No.: 14/731,025

(22) Filed: Jun. 4, 2015

(65) Prior Publication Data
US 2015/0370522 A1 Dec. 24, 2015

(30) Foreign Application Priority Data

Jun. 23, 2014 (CN) .......................... 2014 1 0282564

(51) Int. Cl.
*G06F 3/14* (2006.01)
*H04N 21/485* (2011.01)
(Continued)

(52) U.S. Cl.
CPC ........... *G06F 3/1423* (2013.01); *G09G 5/006* (2013.01); *G09G 5/12* (2013.01); *H04N 21/482* (2013.01);
(Continued)

(58) Field of Classification Search
CPC ........ H04N 21/4126–21/4135; H04N 21/482; H04N 21/485; H04N 21/4108;
(Continued)

(56) References Cited

U.S. PATENT DOCUMENTS 8,289,455 B2  10/2012 Beals et al.
8,863,219 B2 * 10/2014 Brown ................... H04B 1/205
                                                          725/133
(Continued)

FOREIGN PATENT DOCUMENTS

CN   202818524   3/2013
CN   203206404   9/2013
(Continued)

Primary Examiner — Benjamin C Lee
Assistant Examiner — Xuemei Zheng
(74) Attorney, Agent, or Firm — Boyle Fredrickson, S.C.

(57) ABSTRACT

The display device receives first data, including a control instruction, encapsulated at an application layer by a first external device, matching a data protocol of a first dedicated link over the first dedicated link; and if the control instruction is a control instruction directed to the display device, then the display device performs a corresponding operation according to the control instruction; and if the control instruction is a control instruction directed to a second external device, then the display device transmits the first data to the second external device over a second dedicated link so that the second external device performs a corresponding operation according to the control instruction.

13 Claims, 9 Drawing Sheets

(51) Int. Cl.
    *H04N 21/482*    (2011.01)
    *G09G 5/00*    (2006.01)
    *G09G 5/12*    (2006.01)

(52) U.S. Cl.
    CPC ....... *H04N 21/485* (2013.01); *G09G 2370/04* (2013.01)

(58) Field of Classification Search
    CPC ........ G06F 3/1423; G09G 5/006; G09G 5/12; G09G 2370/04
    See application file for complete search history.

(56) References Cited

U.S. PATENT DOCUMENTS

| | | | |
|---|---|---|---|
| 9,438,954 B2* | 9/2016 | Brown | H04B 1/205 |
| 2007/0094691 A1* | 4/2007 | Gazdzinski | H04N 7/17318 |
| | | | 725/62 |
| 2009/0201420 A1* | 8/2009 | Brown | H04B 1/205 |
| | | | 348/552 |
| 2012/0174157 A1* | 7/2012 | Stinson, III | H04N 5/44543 |
| | | | 725/40 |
| 2012/0907419 | 11/2012 | Richardson | |
| 2015/0033281 A1* | 1/2015 | Brown | H04B 1/205 |
| | | | 725/133 |
| 2016/0286279 A1* | 9/2016 | Yang | H04N 21/4126 |

FOREIGN PATENT DOCUMENTS

| | | |
|---|---|---|
| CN | 203352719 | 12/2013 |
| CN | 103686263 | 3/2014 |

\* cited by examiner

US 9,798,507 B2

DISPLAY DEVICE AND CONTROL METHOD

This application claims priority to Chinese Patent Application No. 201410282564.9, and filed with the State Intellectual Property Office of People's Republic of China on Jun. 23, 2014, the entire content of which is herein incorporated by reference.

FIELD

The present disclosure relates to the field of electronics and particularly to a display device and a control method.

BACKGROUND

Since the $21^{st}$ century, the industry of televisions has evolved rapidly towards flat panel, networking and intelligentize televisions, and the calculation capability, storage capability and display capability of the televisions have improved rapidly. For most of the integrated intelligent television products in the existing market, the user have to upgrade the entire television to achieve the upgrading of the function of the entire product, which may bring an extra expense and waste to the user.

In view of this, modular television products which may be functionally separated have emerged, and such products reserve fundamental functions of the unity machine of the television, and add corresponding external devices according to the demands of different users. In this solution, while some external device is operating in the foreground, a control instruction of another external device or the television host needs to be input in a control mode corresponding thereto. For example, a volume adjustment instruction for the television host or an audio device connected with the television host is input to a network set-top box operating in the foreground, to control the television host or the audio device to adjust the volume.

SUMMARY

An embodiment of the present disclosure provides a control method, the method including:

receiving, by the display device, first data including a control instruction over a first dedicated link, herein the first data is encapsulated at an application layer by a first external device, and matches a data protocol of the first dedicated link; and if the control instruction is a control instruction directed to the display device, then performing, by the display device, a corresponding operation according to the control instruction, and if the control instruction is a control instruction directed to a second external device, then transmitting, by the display device, the first data to the second external device over a second dedicated link, so that the second external device performs a corresponding operation according to the control instruction, herein the first dedicated link is a link, between the display device and the first external device, set up through an interface component of the display device; and the second dedicated link is a link, between the display device and the second external device, set up through the interface component of the display device.

An embodiment of the present disclosure provides a display device, including:

an interface component configured to receive first data including a control instruction through a first dedicated link, herein the first data is encapsulated at an application layer by a first external device, and matches a data protocol of the first dedicated link; and when the control instruction is a control instruction directed to a second external device, to transmit the first data to the second external device over a second dedicated link, wherein the first dedicated link is a link, between the display device and the first external device, set up through the interface component, and the second dedicated link is a link, between the display device and the second external device, set up through the interface component; and a processor configured to perform a corresponding operation according to the control instruction, when the control instruction is determined to be a control instruction directed to the display device; and the display device further includes a display screen.

DETAILED DESCRIPTION OF THE EMBODIMENTS

In embodiments of the present disclosure, a display device receives first data encapsulated at an application layer by a first external device over a first dedicated link, the first data includes a control instruction and matches a data protocol of the first dedicated link, and then selects a corresponding processing mode for a particular device to which the control instruction is directed. If the control instruction is a control instruction directed to the display device, then the display device performs a corresponding operation according to the control instruction; and if the control instruction is a control instruction directed to a second external device, then the display device transmits the first data to the second external device over a second dedicated link, so that the second external device performs a corresponding operation according to the control instruction.

The first dedicated link is a link, between the display device and the first external device, set up through an interface component of the display device; and the second dedicated link is a link, between the display device and the second external device, set up through the interface component of the display device.

With the solution above, the control instruction directed to the display device or another external device may be input directly to some external device, to thereby control the corresponding device, so as to improve the convenience and speed of control.

Figure 1:
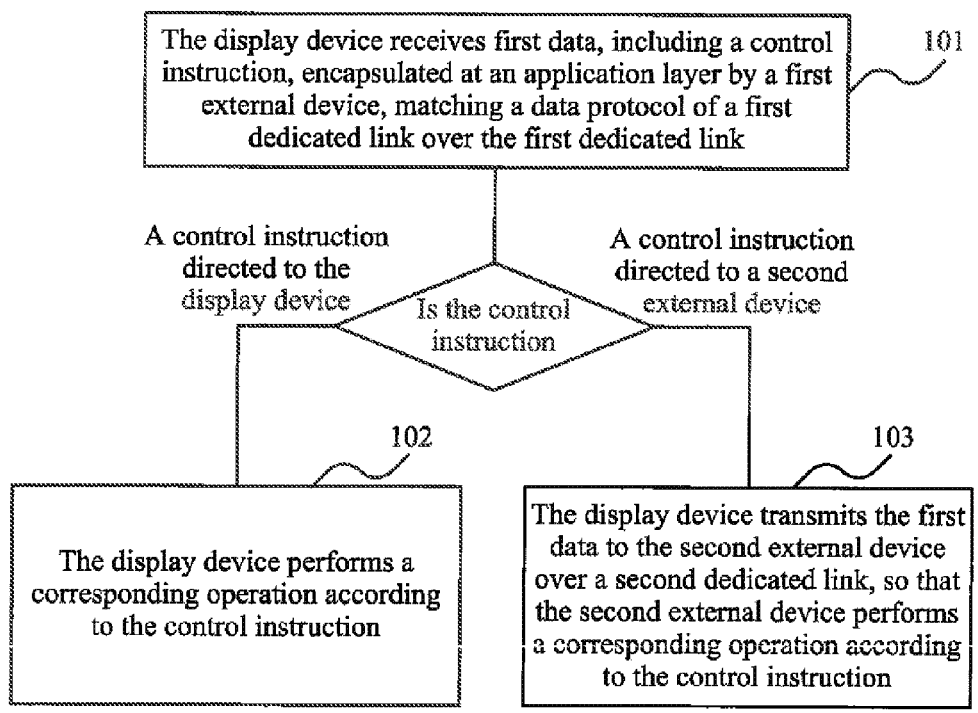
FIG. 1 illustrates a flow chart of a control method according to an embodiment of the present disclosure.

As illustrated in FIG. 1, an embodiment of the present disclosure provides a control method, the method including:

Operation 101: the display device receives first data including a control instruction over a first dedicated link, herein the first data is encapsulated at an application layer by a first external device, and matches a data protocol of the first dedicated link;

Operation 102: if the control instruction is a control instruction directed to the display device, then the display device performs a corresponding operation according to the control instruction; and Operation 103: if the control instruction is a control instruction directed to a second external device, then the display device transmits the first data to the second external device over a second dedicated link, so that the second external device performs a corresponding operation according to the control instruction.

The first dedicated link is a link, between the display device and the first external device, set up through an interface component of the display device; and the second dedicated link is a link, between the display device and the second external device, set up through the interface component of the display device.

In an embodiment of the present disclosure, a display device receives first data encapsulated at an application layer by a first external device over a first dedicated link, the first data includes a control instruction and matches a data protocol of the first dedicated link, and then selects a corresponding processing mode for a particular device to which the control instruction is directed. If the control instruction is a control instruction directed to the display device, then the display device performs a corresponding operation according to the control instruction; and if the control instruction is a control instruction directed to a second external device, then the display device transmits the first data to the second external device over a second dedicated link, so that the second external device performs a corresponding operation according to the control instruction. Thus, the control instruction directed to the display device or another external device may be input directly to some external device, to thereby control the corresponding device, so as to improve the convenience and speed of control.

Some intelligent television, and a Digital Versatile Disc (DVD) player and a network set-top box, both of which are connected with the intelligent television, are taken as an example. In the example, both the DVD player and the network set-top box are connected with the intelligent television through an interface component on the intelligent television. Through the interface component, the intelligent television sets up a first dedicated link with the DVD player, and sets up a second dedicated link with the network set-top box respectively. The interface component may include hardware parts and software parts, and the hardware parts may be common physical interfaces, e.g., a High Definition Multimedia Interface (HDMI), a Universal Asynchronous Receiver and Transmitter (UART), a Universal Serial Bus (USB), etc., and the software components may be private protocol mechanisms where information to be transmitted may be packaged into data matching the corresponding protocols.

In an embodiment, both the first dedicated link and the second dedicated link are set up via a USB interface of the interface component in a private protocol which is a data protocol corresponding to the USB interface. After a user inputs an instruction to the DVD player to adjust the volume of the intelligent television, the DVD player will encapsulate the volume adjustment instruction into data matching the data protocol of the USB at the application layer. The volume adjustment instruction may be encapsulated by an application of the DVD player or by an Application Program Interface (API) toolkit provided by the interface component for the first dedicated link.

The intelligent television receives the encapsulated data over the first dedicated link. Since the data includes the control instruction which is the volume adjustment instruction directed to the intelligent television, the intelligent television will adjust the volume according to the volume adjustment instruction upon reception thereof.

If the instruction input, by a user, to the DVD player is an channel switch instruction directed to the network set-top box, then the intelligent television will further transmit the encapsulated data to the network set-top box over the second dedicated link upon reception of the data over the first dedicated link, and the network set-top box will switch the currently played channel according to the channel switch instruction upon reception of the data.

Before the display device transmits the first data to the second external device over the second dedicated link, the method further includes:

If the display device determines that the first data does not match a data protocol of the second dedicated link, then the first data is encapsulated into data matching the data protocol of the second dedicated link at the application layer.

If the first dedicated link is set up via the USB interface on the interface component, and the second dedicated link is set up via the UART interface on the interface component, then the applicable private protocol of the first dedicated link is the data protocol corresponding to USB, and the applicable private protocol of the second dedicated link is the data protocol corresponding to UART respectively. With the above example of the channel switch instruction directed to the network set-top box, after the intelligent television receives the data matching the data protocol corresponding to the USB, the intelligent television will further encapsulate the received data into data matching the data protocol corresponding to the UART, at the application layer, and then transmit the encapsulated data to the network set-top box over the second dedicated link.

In order to share state information between the external device and the display device, the method further includes:

The display device receives second data, encapsulated by the first external device at the application layer over the first dedicated link, herein the second data matches the data protocol of the first dedicated link, and includes operating state information of the first external device; and the display device encapsulates operating state information of the display device into third data matching the data protocol of the first dedicated link, at the application layer, and transmits the third data to the first external device over the first dedicated link.

An embodiment of the present disclosure may further perform background service management by configuring a background server, and after the display devices receives the second data, encapsulated by the first external device at the application layer, matching the data protocol of the first dedicated link over the first dedicated link, the method further includes:

The display device transmits the operating state information of the display device and the first external device to the background server; and The display device receives a state adjustment instruction from the background server, and performs a corresponding operation according to the state adjustment instruction, the state adjustment instruction is obtained, by the background server, according to the operating state information of the display device and/or the first external device.

For example, the intelligent television transmits, to the background server, the operating state information of the DVD player connected with the intelligent television and the intelligent television. If the operating state information includes configuration information of the current resolution of a display screen of the intelligent television, and there is abnormity in display due to the configuration information, then the background server analyzes the configuration information for the state adjustment instruction to adjust the resolution of the display screen. The display device may receive the state adjustment instruction obtained by the background server and perform a corresponding operation according to the state adjustment instruction, to reconfigure the resolution of the display screen for normal display.

Similarly, the background server may alternatively obtain from the operating state information a state adjustment instruction to push a relevant service, for example, the operating state information includes information about a channel being currently played by the intelligent television. The background server may obtain relevant information of interest to the user, e.g., the relevant service of interest to the user etc., according to the information about the channel, and then generate the state adjustment instruction to push the relevant service. The display device may apply the service upon reception of the state adjustment instruction.

The background server may be a server on which a monitor program is run or may be a monitor center consisted of multiple servers to provide an operating state monitor function.

Figure 2:
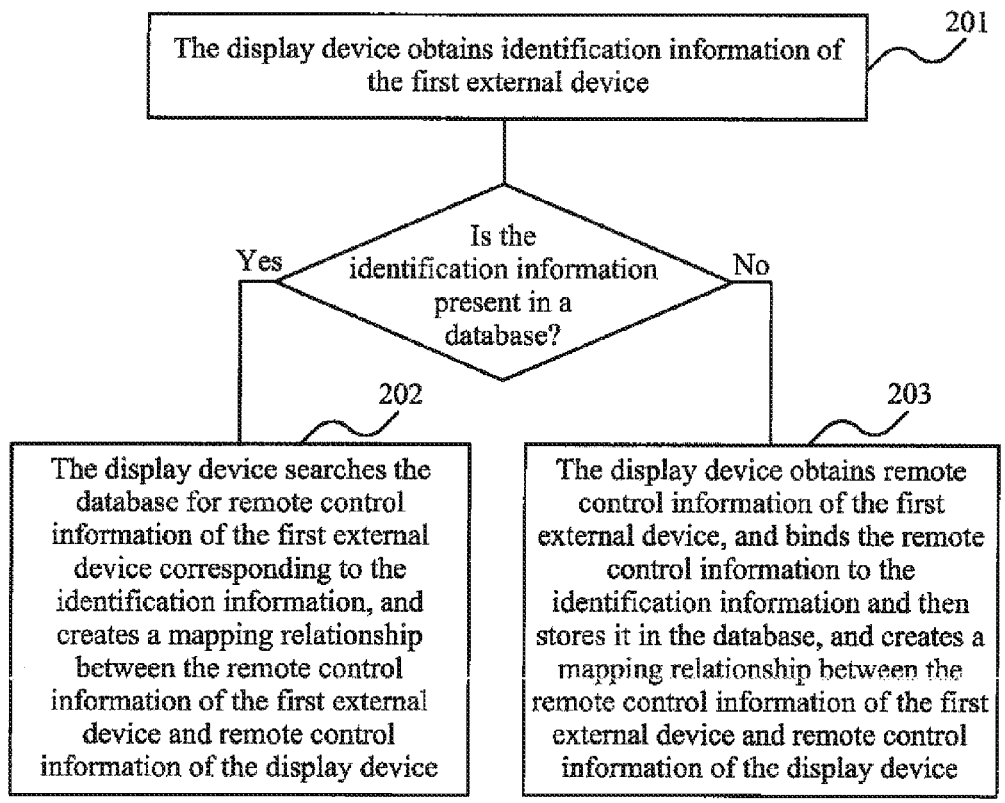
FIG. 2 illustrates a flow chart of a method for creating a mapping relationship between remote control information of a display device and an external device according to an embodiment of the present disclosure.

In order to provide a more comprehensive shared control function, the method further includes a flow of creating a mapping relationship of remote control information, particularly as illustrated in FIG. 2:

In the operation 201, the display device obtains identification information of the first external device and determines whether the identification information is present in a database of the display device;

In the operation 202, if the identification information is present in the database of the display device, then the display device searches the database for remote control information of the first external device corresponding to the identification information, and creates a mapping relationship between the remote control information of the first external device and remote control information of the display device; and In the operation 203, if the identification information is absent, then the display device obtains remote control information of the first external device and binds the remote control information to the identification information and then stores it in the database, and creates a mapping relationship between the remote control information of the first external device and remote control information of the display device.

Figure 3:
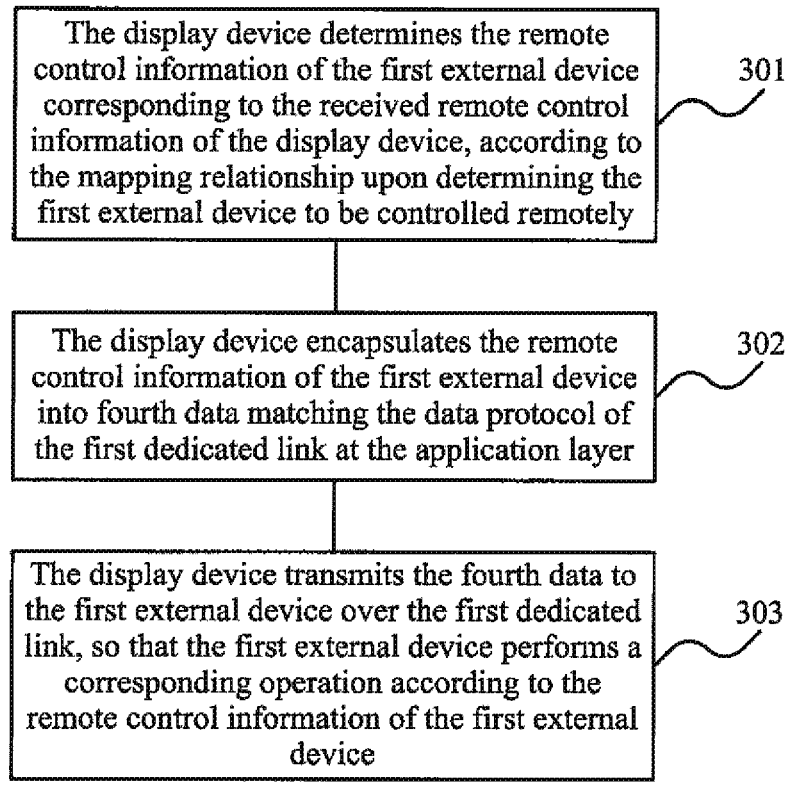
FIG. 3 illustrates a flow chart of a control method according to the mapping relationship according to an embodiment of the present disclosure.

In an embodiment of the present disclosure, after the display device creates the mapping relationship between the remote control information of the first external device and the remote control information of the display device, a control method according to the mapping relationship is further provided, and the particular flow is as illustrated in FIG. 3:

In the operation 301, the display device determines the remote control information of the first external device, corresponding to the received remote control information of the display device, according to the mapping relationship, after determining the first external device to be controlled remotely;

In the operation 302, the display device encapsulates the remote control information of the first external device into fourth data matching the data protocol of the first dedicated link at the application layer; and In the operation 303, the display device transmits the fourth data to the first external device over the first dedicated link, so that the first external device performs a corresponding operation, according to the remote control information of the first external device.

With the above example in which there are an intelligent television and a DVD player connected with intelligent television, the intelligent television obtains identification information of the DVD player to identify an accessing device. The identification information may be a device code of the DVD player, or may be a unique and invariable code allocated by the intelligent television to the DVD player initially connected with the intelligent television. The intelligent television will search the database for the identification information corresponding to the device.

If the identification information of the DVD player is present in the database, then it indicates that the DVD player has been registered, and remote control information of the DVD player may be found in the database according to the identification information, and then a mapping relationship may be created between the remote control information of the DVD player and remote control information of the intelligent television. For example, the intelligent television may be associated with a button map of a remote controller of the DVD player.

If the identification information of the DVD player is absent in the database, then it indicates that the DVD player has not been registered, so that its identification information and remote control information has not been logged in the database. Thus the intelligent television obtains remote information of the DVD player and binds it with the identification information and then stores it in the database. Also a mapping relationship will be created between the remote control information of the DVD player and remote control information of the intelligent television.

If the intelligent television determines that the DVD player needs to be controlled, after the value of a button A on the remote controller of the intelligent television is received, if there is a mapping relationship between the value of the button A and the value of a button B on the DVD player, the intelligent television will generate the value of the button B, and then encapsulate the value of the button B into data matching the data protocol of the first dedicated link, and transmit the data to the DVD player over the first dedicated link, so that the DVD player may perform a corresponding operation according to remote control information corresponding to the value of the button B.

Based upon the same inventive idea, an embodiment of the present disclosure further provides a display device corresponding to the method above, and since the display device addresses the problem under a similar principle to the method, reference may be made to the implementation of the method above for an implementation of the display device, so a repeated description thereof will be omitted here.

Figure 4:
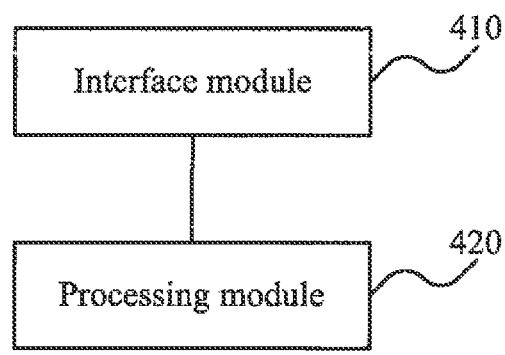
FIG. 4 illustrates a structural schematic diagram of a display device according to an embodiment of the present disclosure.

As illustrated in FIG. 4, an embodiment of the present disclosure provides a display device including:

An interface component 410 is configured to receive first data including a control instruction over a first dedicated link, herein the first data is encapsulated at an application layer by a first external device, and matches a data protocol of the first dedicated link; and upon determining that the control instruction is a control instruction directed to a second external device, to transmit the first data to the second external device over a second dedicated link, so that the second external device performs a corresponding operation according to the control instruction, herein the first dedicated link is a link, between the display device and the first external device, set up through the interface component, and the second dedicated link is a link, between the display device and the second external device, set up through the interface component; and A processor 420 is configured to perform a corresponding operation according to the control instruction, when the control instruction is determined to be a control instruction directed to the display device.

The processor 420 is further configured:

before the first data is transmitted to the second external device over the second dedicated link, if the display device determines that the first data does not match a data protocol of the second dedicated link, to encapsulate the first data into data matching the data protocol of the second dedicated link at the application layer.

The interface component 410 is further configured:

to receive second data, encapsulated by the first external device at the application layer, matching the data protocol of the first dedicated link over the first dedicated link, herein the second data includes operating state information of the first external device; and to transmit third data to the first external device over the first dedicated link; and The processor 420 is further configured:

to encapsulate operating state information of the display device into the third data matching the data protocol of the first dedicated link at the application layer.

The interface component 410 is further configured:

upon reception of the second data, encapsulated by the first external device at the application layer, matching the data protocol of the first dedicated link over the first dedicated link, to transmit the operating state information of the display device and the first external device to a background server; and to receive a state adjustment instruction obtained by the background server from the operating state information of the display device and/or the first external device; and The processor 420 is further configured:

to perform a corresponding operation according to the state adjustment instruction.

The interface component 410 is further configured:

to obtain identification information of the first external device, and to obtain remote control information of the first external device upon determining that the identification information is absent in the database of the display device; and The processor 420 is further configured:

to determine whether the identification information is present in the database of the display device; and if the identification information is present in the database of the display device, to search the database for remote control information of the first external device corresponding to the identification information, and to create a mapping relationship between the remote control information of the first external device and remote control information of the display device, and if the identification information is absent in the database of the display device, to obtain remote control information of the first external device, and then bind the remote control information to the identification information and store it in the database, and to create a mapping relationship between the remote control information of the first external device and remote control information of the display device.

The processor 420 is further configured:

after the mapping relationship between the remote control information of the first external device and the remote control information of the display device is created, and the first external device is determined to be controlled remotely, to determine the remote control information of the first external device corresponding to the received remote control information of the display device, according to the mapping relationship; and to encapsulate the remote control information of the first external device into fourth data matching the data protocol of the first dedicated link at the application layer; and The interface component 410 is further configured:

to transmit the fourth data to the first external device over the first dedicated link, so that the first external device performs a corresponding operation according to the remote control information of the first external device.

Figure 5:
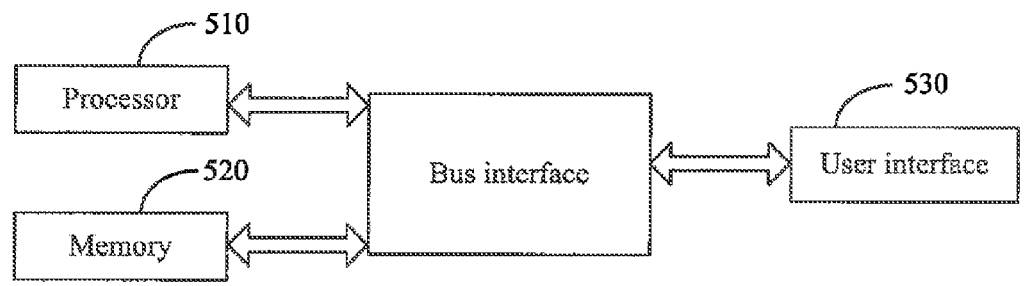
FIG. 5 illustrates a schematic diagram of a hardware structure of a host system in a display device according to an embodiment of the present disclosure.

An embodiment of the present disclosure further provides another display device, which is an intelligent television, including a host system, and audio and video components, and the display device is connected with background server over a network. The hardware structure of the host system as illustrated in FIG. 5 includes a processor 510, a memory 520, a user interface 530, and a bus interface via which the processor 510, the memory 520, and the user interface 530 are connected, The audio and video components include a display screen and an audio device, arranged on the host system, to output audio and video data processed by the host system; and the background server connected with the host system over the network is configured to monitor and adjust operating states of the host system, and of an external device connected with the host system.

In the host system, the processor 510 is configured to receive first data, including a control instruction over the first dedicated link, herein the first data is encapsulated at an application layer by a first external device, and matches a data protocol of a first dedicated link; and if the control instruction is a control instruction directed to the display device, to perform a corresponding operation according to the control instruction, and if the control instruction is a control instruction directed to a second external device, to transmit the first data to the second external device over a second dedicated link, so that the second external device performs a corresponding operation according to the control instruction.

The user interface 530 is configured to provide an interface via which the external device is connected, so that multimedia data, operating state information, control information and other data are exchanged between the host system and the external device, to provide a power service, and to set up the first dedicated link between the display device and the first external device, and the second dedicated link between the display device and the second external device.

The processor 510 is further configured:

before the first data is transmitted to the second external device over the second dedicated link, if the display device determines that the first data does not match a data protocol of the second dedicated link, to encapsulate the first data into data matching the data protocol of the second dedicated link at the application layer.

The processor 510 is further configured:

to receive second data, encapsulated by the first external device at the application layer, matching the data protocol of the first dedicated link over the first dedicated link, where the second data includes operating state information of the first external device; and to encapsulate operating state information of the display device into third data matching the data protocol of the first dedicated link at the application layer, and to transmit the third data to the first external device over the first dedicated link.

The processor 510 is further configured, upon reception of the second data, encapsulated by the first external device at the application layer, matching the data protocol of the first dedicated link over the first dedicated link, to transmit the operating state information of the display device and the first external device to a background server; and to receive a state adjustment instruction obtained by the background server from the operating state information of the display device and/or the first external device, and to perform a corresponding operation according to the state adjustment instruction.

The processor 510 is further configured:

to obtain identification information of the first external device, and to determine whether the identification information is present in a database of the display device; and if the identification information is present in the database of the display device, to search the database for remote control information of the first external device corresponding to the identification information, and to create a mapping relationship between the remote control information of the first external device and remote control information of the display device, and if the identification information is absent in the database of the display device, to obtain remote control information of the first external device, and bind the remote control information to the identification information and then store it in the database, and to create a mapping relationship between the remote control information of the first external device and remote control information of the display device.

After the mapping relationship is created between the remote control information of the first external device and the remote control information of the display device, the processor 510 is further configured, if the first external device is determined to be controlled remotely, to determine the remote control information of the first external device corresponding to the received remote control information of the display device, according to the mapping relationship;

to encapsulate the remote control information of the first external device into fourth data matching the data protocol of the first dedicated link at the application layer; and to transmit the fourth data to the first external device over the first dedicated link, so that the first external device performs a corresponding operation, according to the remote control information of the first external device.

In FIG. 5, the bus architecture may include any number of interconnection buses and bridges linked together, and particularly the bus architecture may include various circuits including one or more processors represented by the processor 510, and one or more memories represented particularly by the memory 520. The bus architecture may further link together various other circuits, e.g., peripheral devices, voltage stabilizers, power management circuits, etc., all of which are well known in the art, so a repeated description thereof will be omitted here. The bus interface provides an interface. The processor 510 is used for managing the bus architecture and typical processes, and the memory 520 may store data used by the processor 510 when the processor 510 is performing operations, e.g., identification information, remote control information, etc., stored in the database of the display device according to embodiments.

Figure 6:
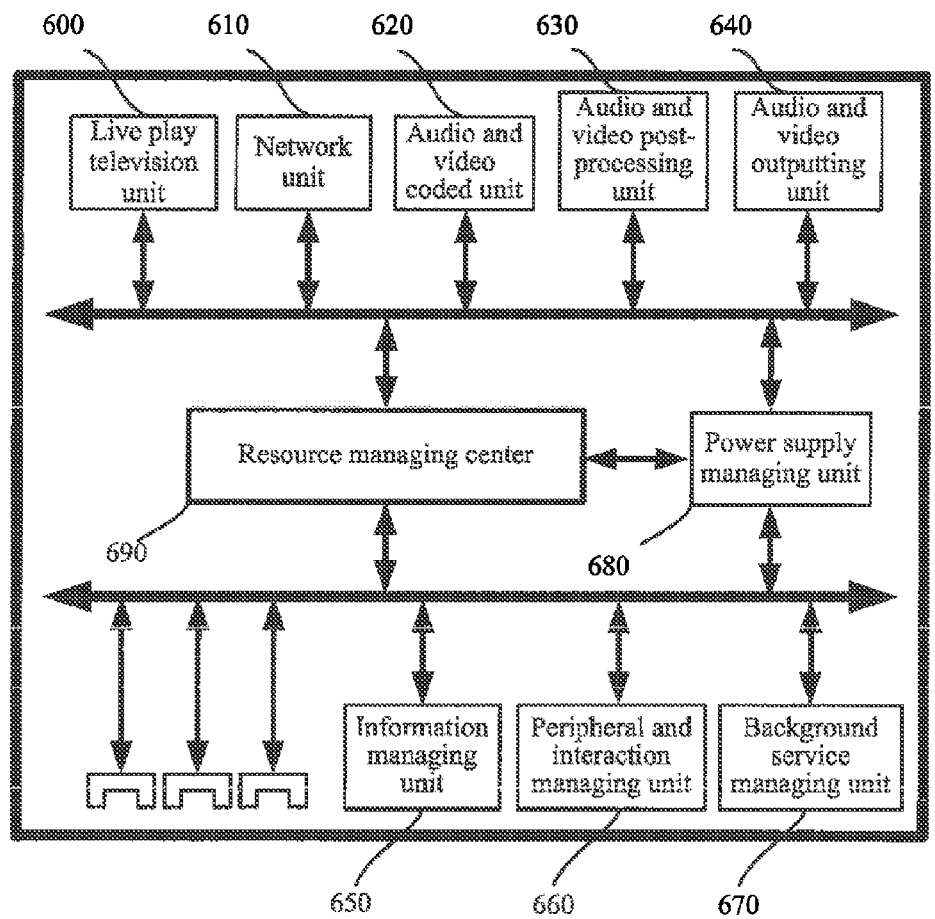
FIG. 6 illustrates a schematic diagram of a functional structure of a processor in a host system in a display device according to an embodiment of the present disclosure.

The processor 510, the memory 520, the user interface 530, and the bus interface of the host system may be integrated in a single circuit board, or may be functionally embodied as multiple circuit boards. The overall function of the processor may be distributed into several virtual functional units including a live television unit 600, a network unit 610, an audio and video coded unit 620, an audio and video post-processing unit 630, an audio and video outputting unit 640, an information managing unit 650, a peripheral and interaction managing unit 660, a background service managing unit 670, a power supply managing unit 680, and a resource managing center 690 scheduling the units above as a whole, particularly as illustrated in FIG. 6. In an embodiment, the virtual functional units above may be functionally embodied as several differently functioning processors represented by the processor 510, e.g., a television tuner, an analog television demodulator and decoder, a digital television demodulator and decoder, etc.

The live television unit 600 is configured to perform receiving and decoding functions of analog television and digital television. The television tuner receives an analog or digital television broadcasting signal, and sends the analog television broadcasting signal to the analog television demodulator and decoder, and sends the digital television broadcasting signal to the digital television demodulator and decoder for processing. Decoded audio and video information will be output in the case of receiving the analog television; and demodulated audio and video transmission stream information is output in the case of receiving the digital television.

The network unit 610 is configured to access an external network, and to provide the host system with network services and network information monitor. The network unit may access the network in a wired, wireless or a Power Line Communication (PLC) manner or the like, and access a network data route manager via a uniform network interface. The network data route manager provides the host system with network services through routing. The network information monitor processor monitors the access to the external network, and usage of the network services in the host system.

The audio and video coded unit 620 is configured to encode and decode audio and video. The decoding function supports de-multiplexing of transmission streams, and decoding of audio and video in a number of formats. The encoding function supports compression and encoding of audio and video data, and interlace-multiplexing and packaging the data into a transmission stream in a fixed format. The encoding and decoding information monitor processor is used for recording and controlling key information in encoding and decoding, e.g., audio and video encoding schemes, code rates, resolutions, etc.

The audio and video post-processing unit 630 is configured to post-process the decoded non-compressed audio and video, including video noise detecting, analyzing and processing, converting between a number of video formats (e.g., converting the size in resolution, converting the frame rate, etc.), video enhancing (detail enhancement, contrast enhancement, color management, etc.), sound effect related balance/Dolby, and other functions.

The audio and video outputting unit 640 is configured to output the video on a display screen and to output the audio through a sounder. In an embodiment of the present disclosure, the display screen includes a primary screen and a secondary screen, so that data may be displayed on the secondary screen in addition to the traditional single primary screen. The primary screen is configured to display video contents being currently played, and the secondary screen is configured to provide value-added service information in addition to the video contents, e.g., to display information about the host system, information about the peripheral devices, information about a background server, and other information.

The information managing unit 650 is configured to manage operating states of the host system, and of the external device accessing the host system, to exchange the operating state information of the host system, and of the external device of the host system, and to collect and monitor the operating state information.

The peripheral and interaction managing unit 660 is configured to manage the access and control of the external device, including registering upon the access of the external device, and managing and controlling some external device capable of interaction.

The background service managing unit 670 is configured to monitor interaction between the host system and the background server, so that the background server may monitor state information of the host in real time, and to manage some service function, to collect and analyze the state information of the television, to maintain the system, to push an intelligent service, etc.

The power supply managing unit 680 is configured to adjust dynamically a power supply management strategy, according to the operating states of the host system and the external device. The power supply managing unit may adjust automatically according to the current operating state, or may configure a system power supply management mode as needed according to an external instruction. In an embodiment of the present disclosure, three power supply management schemes are defined respectively as a general power supply management mode, an advanced power supply management mode and an intelligent power supply management mode.

Figure 7:
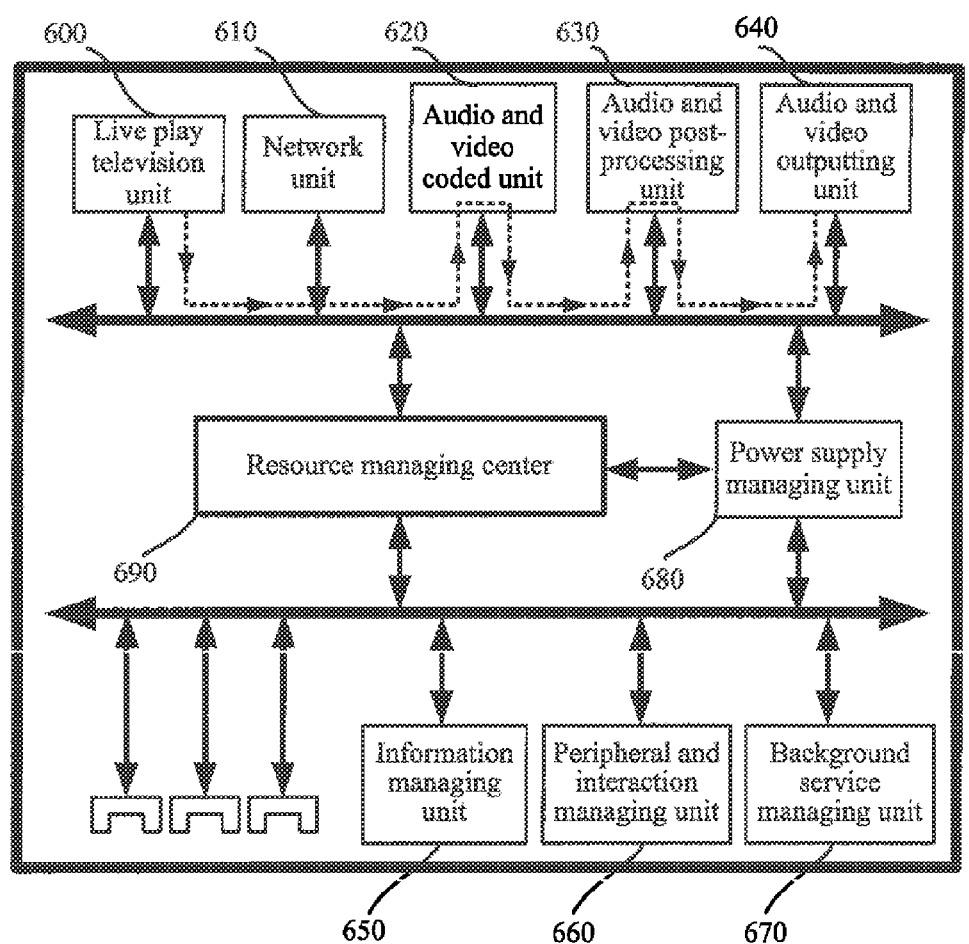
FIG. 7 illustrates a schematic diagram of a data pathway for an internal live function in a display device according to an embodiment of the present disclosure.

The resource managing center 690 is configured to schedule the respective functional units above as a whole. With scheduling by the resource managing center, the processor of the host system may implement the following functions:

Television Live Function:

A data pathway is configured to perform a television live function generally including an internal live function and an external live function. FIG. 7 illustrates the data pathway for the internal live function, the television live data pathway is set up through the internal live television unit 600, the audio and video encoding and decoding unit 620, the audio and video post-processing unit 630, and the audio and video outputting unit 640, and video data may be output on the display screen after being processed sequentially by these units.

The external live function is performed, by setting up the television live data pathway through the external device having the television broadcasting signal receiving function, and demodulating and decoding functions, and the internal live television unit 600, the audio and video encoding and decoding unit 620, the audio and video post-processing unit 630, and the audio and video outputting unit 640 in the intelligent television. External live components may be input in three manners of: 1) a manner of transmission streams or compressed code streams, in which the components need to be processed by the audio and video encoding and decoding unit 620, and the audio and video post-processing unit 630, and finally output by the audio and video outputting unit 640; 2) a manner of non-compressed audio and video code rates, in which the components are processed by the audio and video post-processing unit 630, and finally output by the audio and video outputting unit 640; and 3) a manner of directly outputting audio and video code streams, in which the components are output directly by the audio and video outputting unit 640 without being processed internally.

Interaction and Control Managing Function of External Device:

The external device may be categorized based on its interaction characteristic into three categories of a storage external device: an audio and video external device, and an interactive external device.

The storage external device refers to an external device with a storage function, e.g., a U-disk, a mobile hard disk, etc. The host and another external device connected with the host read data to or write data from the storage external device, e.g., a picture, etc., for display, obtain video for decoding and display, or store program, video, a picture, etc., into the storage external device, and an external device with an intelligent system may also install and run the program stored in the storage external device.

The audio and video external device refers to an external device inputting video, e.g., a DVD player, a network set-top box, a game host, etc. The host system may post-process audio and video input by the external device and then output them through the audio and video outputting unit, or may output them directly through the audio and video outputting unit, or may compress and encode and then store them; and if another external device connected with the host system has video receiving and processing functions, then the audio and video may also be input to the other external device for processing.

The interactive external device refers to an external device providing an interaction control function, e.g., a web camera, a mouse, an intelligent remote controller, a mobile terminal, an external network card, etc. The host system selects a processing mode of the interaction control function, dependent upon the current operating state (primarily a display output state). When the displayed state of the host system is an output state, various interaction control functions may be performed totally in the control mode preset by the host; and when the displayed state of the external device is an output state, various remote control information is converted, by the interaction information converting function, into remote control information of the external device, and transmitted to the external device through the dedicated link set up via the user interface for interaction. If the host accesses the network through the external device (e.g., an external network card), the peripheral and interaction managing unit will have the external network card access the network unit, so that the network unit manages network services on the external network card.

Operating modes of the three categories of external devices above may be categorized into a foreground operating mode and a background operating mode.

In the foreground operating mode, the external device in this mode takes over a part of the interface resources, a part of the system management functions and a part of the background service management functions of the host system. For example, the external device is an intelligent television peripheral device functioning as an integrated intelligent television, including live television, network video, intelligent applications, interactive games, etc. The host system sets the external device in the foreground operating mode, and the external device presents the display on the display screen via the user interface, and in this mode, a part of the functions of the processor in the host system enters the background mode without being further handled, and in the meantime a part of the interface resources (e.g., USB, HDMI, UART, etc.), a part of the system management functions (image generation, sound parameter adjustment, etc., by the host system), a part of the background service management functions (e.g., system state monitor, background service push management, etc.), etc., are open to the external device for use.

In the background operating mode, the external device in this mode is managed and controlled by the host system. For example, the external device is a storage external device, or an external device for compressing video, etc., which only records or processes data of the operating host system, and in this mode, the host system maintains the foreground operating mode where it performs normal functions.

When a number of external devices access the host system, only the host system or only one of the external devices operates in the foreground operating mode by default.

The host system will manage an access of the three categories of external devices above in two manners.

If the external device has been registered in a local database of the host system or an external database of the background server, then the accessing external device may be identified automatically by the host, and the host system may control the external device or open relevant resources of the host to the external device, according to information of the external device registered in the database. For example, the host may control the external device or open interface resources of the host to the external device, according to mapped remote control information, to thereby enable the resources to be controlled and shared between external devices via the user interface.

If the external device is not a general-category peripheral device, or accesses the host for the first time and has not been registered in the local database or the external database, then the host system may enable fundamental functions of the external device to be performed, and allow the external device to be upgraded in the database, and to provide corresponding functions after being registered.

Figure 8:
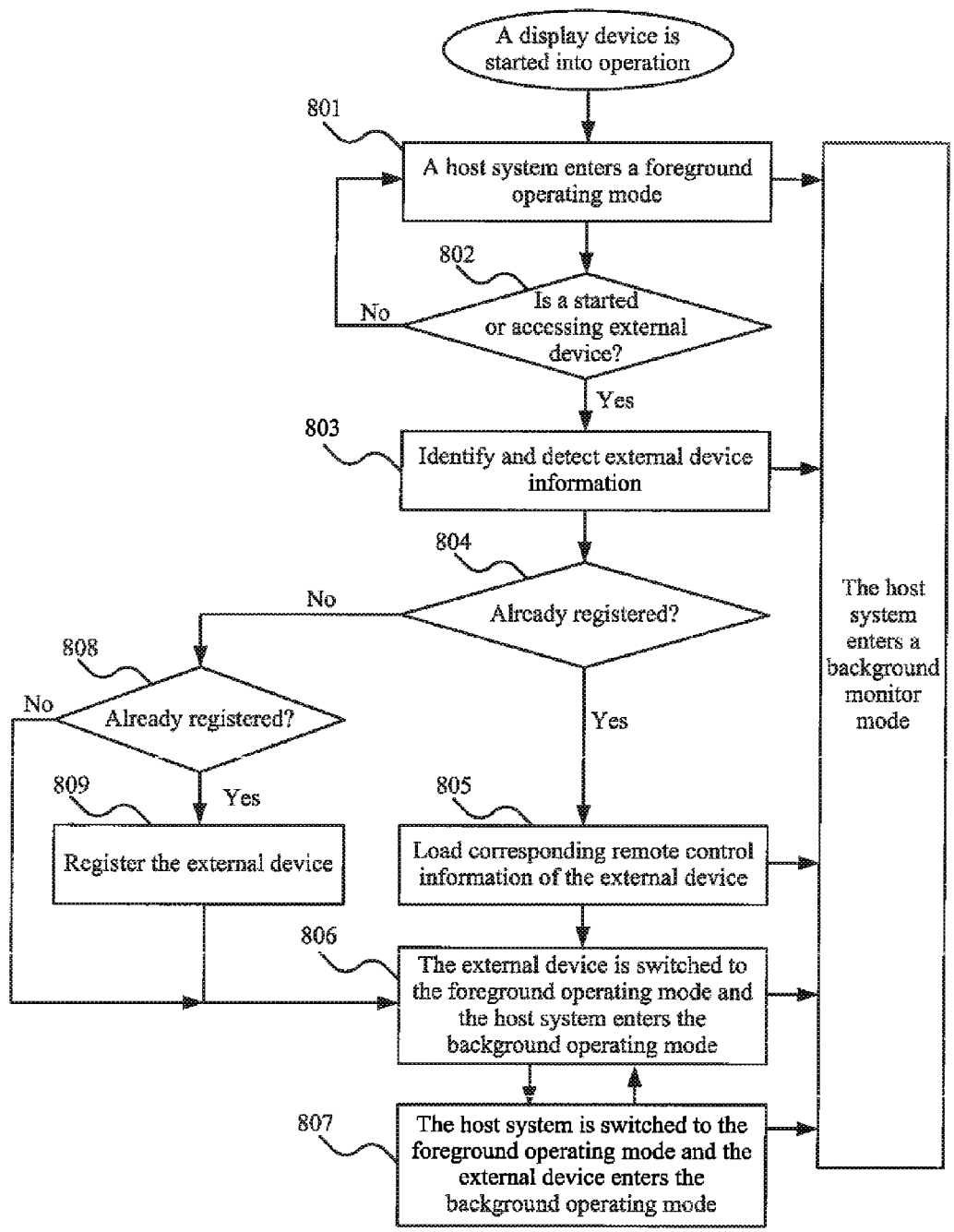
FIG. 8 illustrates a flow chart of a method for an access management on an external device by a display device according to an embodiment of the present disclosure.

As illustrated in FIG. 8, an embodiment of the present disclosure provides a method for managing an access of an external device, the method including:

Operation 801 is to start a display device to operate, and a host system of the display device enters a foreground operating mode.

Operation 802 is to determine the host system whether there is a started or accessing external device; and if there is a started or accessing external device, then the flow proceeds to the operation 803; if there is neither a started external device nor an accessing external device, the host system maintains the foreground operating mode until a external device is started or accessed, Operation 803 is to identify and detecting the external device information, for example, the identification information of the external device is obtained.

Operation 804 is to search a local or external database for the identification information of the external device, and determine whether the external device has been registered; and if the external device has been registered, then the flow proceeds to the operation 805; otherwise, the flow proceeds to the operation 808.

Operation 805 is to obtain and load corresponding remote control information, after the identification information of the external device is found in the database. Generally the remote control information is loaded, by creating a mapping relationship between the remote control information of the external device and remote control information of the display device.

Operation 806 is to switch to the foreground operating mode of the external device dependent upon the demand, while the host system enters a background operating mode.

Operation 807 is to switch to the foreground operating mode of the host system dependent upon the demand, while the external device enters the background operating mode; and the operation 807 and the operation 806 relate to two different operating modes which may be switched back and forth dependent upon the demand.

Operation 808 is to determine whether to register the external device. Some uncommon non-general devices will not be registered, because they are difficult to be managed in a standardized manner, but these devices will be controlled in a manner specific to these devices, and the subsequent operation 806 and operation 807 may be performed dependent upon the demand of an operating mode. Some common general device may be registered in the operation 809.

Operation 809 is to register the external device. The identification information and the remote information of the external device is obtained, and associated and registered in the database, and the remote control information is loaded, and then the subsequent operation 806 and operation 807 may be performed dependent upon the demand of an operating mode.

In the process above, the host system performs background monitor through the background service managing unit.

Most of display devices, e.g., an intelligent television, etc., tend to be equipped with a corresponding interactive external device for interactive control on the corresponding interactive external device. If remote control information of another audio and video external device is loaded in the host system in the method illustrated in FIG. 8, then after the mapping relationship between remote control information of the audio and video external device and remote control information of the display device is created, interaction information may be converted according to the mapping relationship, so that the audio and video external device may be controlled by the interactive external device corresponding to the display device.

The interactive external device may generally include a normal remote controller (e.g., a remote controller, transmitting remote control information through the value of a remote control button) and an intelligent remote controller (e.g., a mobile terminal, transmitting remote control information via voice).

For the normal remote controller, the remote control information is loaded in the host system, and the mapping relationship between the remote control information of the external device and the remote control information of the display device, so that interaction information may be converted conveniently. For the remote control information transmitted via voice or the like, it may be difficult to convert interaction information as above, but the voice information may be transmitted directly to the external device for processing by the external device.

Figure 9:
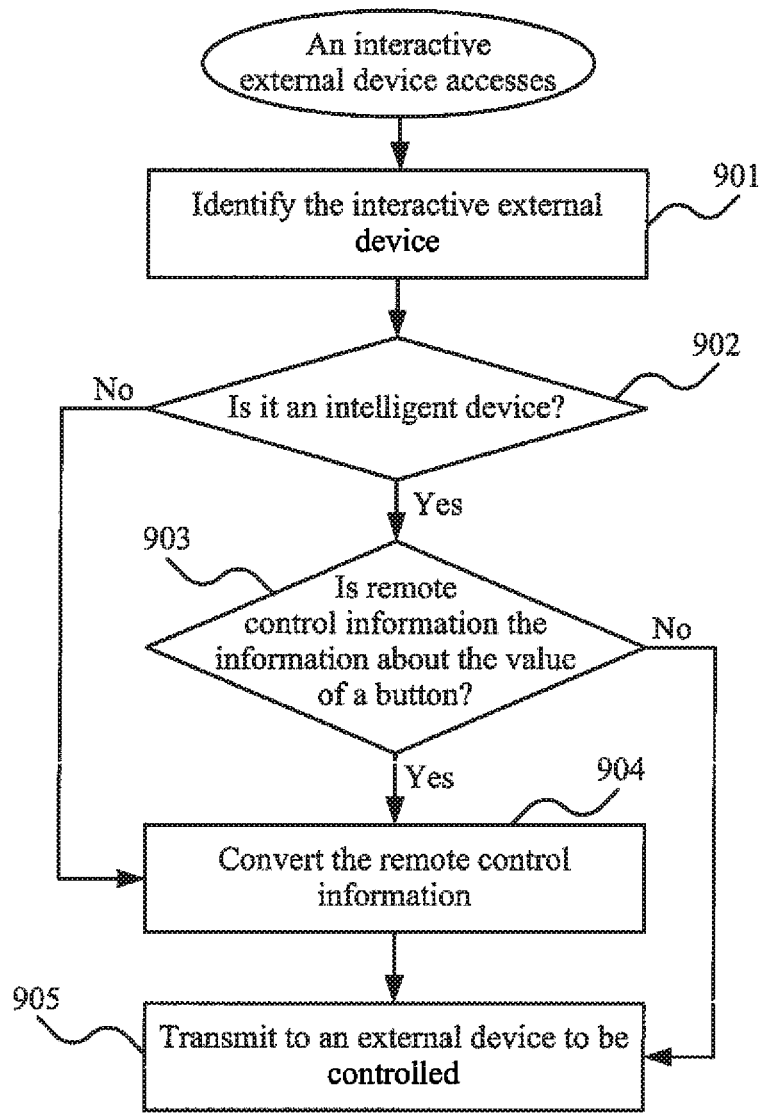
FIG. 9 illustrates a method for control on an interactive external device by a display device according to an embodiment of the present disclosure.

As illustrated in FIG. 9, an embodiment of the present disclosure provides a control method by converting remote control information of an interactive external device, the method including:

Operation 901 is to identify an interactive external device, after the interactive external device accesses.

Operation 902 is to determine whether the interactive external device is an intelligent device, and if the interactive external device is an intelligent device, then the flow proceeds to the operation 903; if the interactive external device is not an intelligent device, the flow proceeds to the operation 904.

Operation 903 is to determine whether remote control information transmitted by the interactive external device is normal information about the value of a button, and if remote control information transmitted by the interactive external device is normal information about the value of a button, then the flow proceeds to the operation 904; if remote control information transmitted by the interactive external device is not the normal information about the value of a button, the remote control information is intelligent remote control information, e.g., voice, etc., and the flow may proceed to the operation 905 where the remote control information is transmitted directly to an external device to be controlled, and controlled by the external device.

Operation 904 is to convert the remote control information. In a particular implementation, the remote control information may be converted, according to the mapping relationship between the remote control information of the external device to be controlled and the remote control information of the display device.

Operation 905, the remote control information is transmitted to the external device to be controlled.

Information Management Function of Display Device and External Device

After the display device enters the operating mode, the host system operates in the background monitor state, collects operating state information in the host system, and determines whether the operating state information needs to be uploaded to the background server, according to a preset condition, and if the operating state information needs to be uploaded to the background server, then the host system uploads the operating state information to the background server; if the operating state information does not need to be uploaded to the background server, the host systems stores the operating state information locally.

Moreover, an embodiment of the present disclosure may further manage information about an operating state of the external device accessing the host. Since a dedicated link set up via the user interface may be dedicated to transmission of the information about the operating state (e.g., a foreground operating period of time, a background operating period of time, etc.), control information, etc., of the external device. For example, after the display device enters the operating mode, the host system operates in the background monitor state, and after the external device is started or accessed, the host system identifies the external device and fetches relevant information, and the external device is switched to the foreground operating mode based upon the demand, while the host system enters the background operating mode; and when the host system needs to operate in the foreground, the host system is further switched to the foreground operating mode of the host system. In this process, all of the identification information, the information about the operating state, the switch information, etc., of the external device is transmitted to the host system via the dedicated link and monitored by the information managing unit of the processor.

Background Service Management Function

After the display device enters the operating state, the display device may monitor and collect, in real time, information about operating states of the display device and the external device. The operating state information may be stored locally, or transmitted by the display device to the background server for monitor. The background server may analyze the information about the operating state of the display device or the external device, and if it is found that the operating state needs to be revised or maintained, then a state adjustment instruction will be transmitted to the host system of the display device. The host system may alternatively transmit, on its own initiative, a system maintenance request to the background server, to request for adjustment to the state. The host system will adjust the operating state according to the state adjustment instruction, upon reception of the instruction, and may feed back an adjustment result. The process above may be performed in the foreground or may be performed automatically in the background.

Additionally, the background server may further push intelligent service information, and the host system of the display device may determine whether the intelligent service information may be applicable upon reception of the intelligent service information of the background server, and if the intelligent service information is not applicable, then the application result of the intelligent service information being not applicable will be fed back to the background server.

Power Supply Management Function

The traditional power supply management solution of the entire television may be inefficient, due to dynamic operating characteristics of the external device and the respective functional units in the display device. Thus, an embodiment of the present disclosure provides an intelligent power supply management solution which may adjust dynamically an output of the power supply, according to the operating states of the external device and the respective components or functional units in the display device, particularly by applying three power supply management modes including a general power supply management mode, an advanced power supply management mode and an intelligent power supply management mode.

In the general power supply management mode, the power supply of the display device in this mode will power all the external device, and the components in the display device, so that all the devices will be powered all the time. In operation, the power supply managing unit may stop a part of circuit, corresponding to a specified component or some separate functional unit, from being powered according to an instruction, to thereby lower power consumption. For example, the external device may be stopped from being powered, when the host system is operating with the internal live function.

In the advanced power supply management mode, the power supply managing unit in this mode may power, as per a preset powering strategy, according to a preset operating condition. The host system will detect an operating condition, and enable automatically the advanced power supply management mode, when an operating condition is satisfied. For example, the operating condition of the host system may be preset to the internal live function, and only a part of circuit, corresponding to a functional unit related to this function, needs to operate, therefore the external device, the user interface and the other related circuits will not be powered, and a supply of power to the corresponding circuit or component will be enabled by the power supply managing unit, upon reception of an enabling instruction.

In the intelligent power supply management mode, the host system in this mode will monitor automatically the operating states of the respective external devices or the host, and if a circuit, corresponding to a functional unit in the host or the external device, has been idle for more than a preset period of time, then a supply of power for the corresponding part will be disabled automatically. For example, if the host has been in the internal live functional mode for a long period of time, and the external device and the remaining functional units have been idle for more than some period of time, then the supply of power for the external device and the remaining functional units may be disabled automatically.

Since the display device allows the external device to be in the foreground operating mode, an information preview picture is defined in an embodiment of the present disclosure, for a display switching process between the respective external devices and the display device. The information preview picture is a default startup picture of the display device with a one-key return function (returning to the picture according to a return instruction in any state). The information preview picture may have information about all the devices, which may operate in the foreground, presented in the same view, where an input mode of corresponding one of the devices may be entered by selection.

Figure 10:
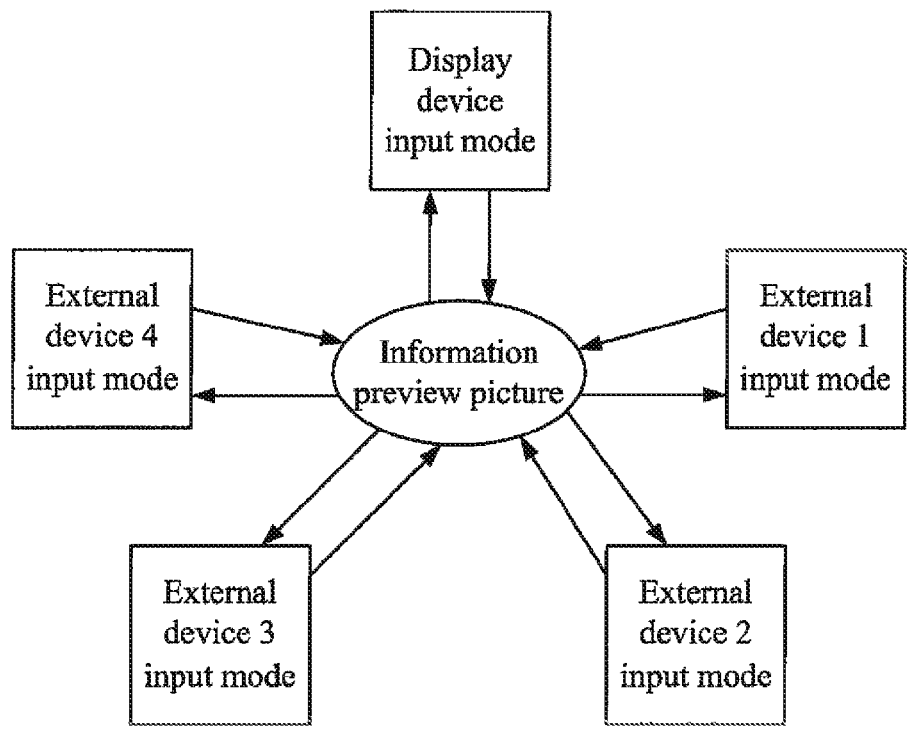
FIG. 10 illustrates a schematic principle diagram of a returned switch mode according to an embodiment of the present disclosure.

In addition to the information preview picture above, an embodiment of the present disclosure provides a returned switch mode in a switching principle as illustrated in FIG. 10. When the display device in an input mode of some external device receives a switching instruction, the process returns to the information preview picture, and then selects to enter the input mode of a desirable external device or the display device.

Figure 11:
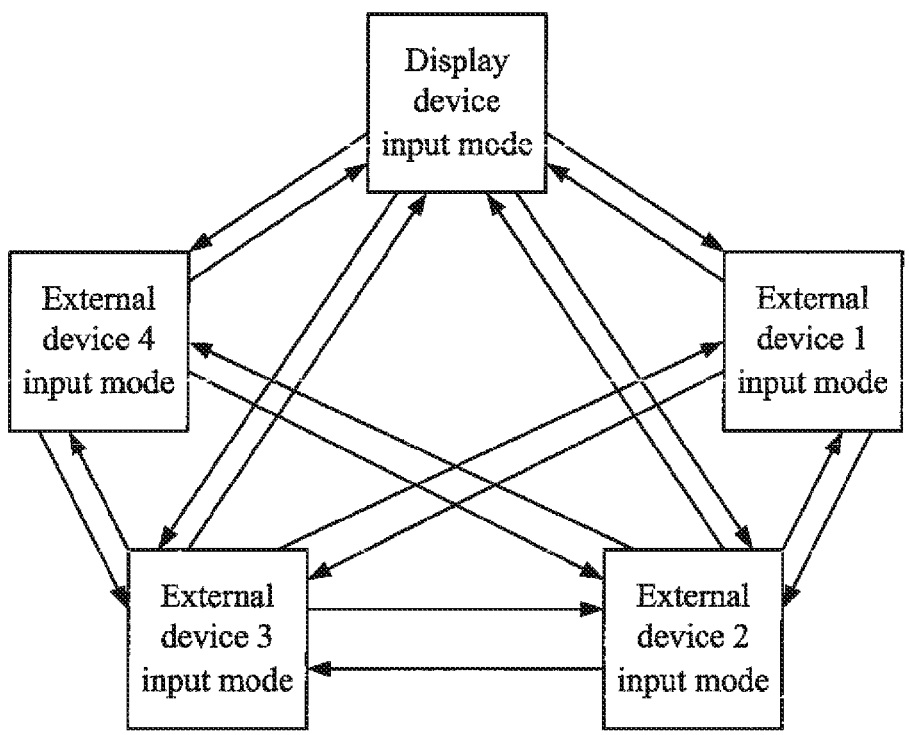
FIG. 11 illustrates a schematic principle diagram of a one-key switch mode according to an embodiment of the present disclosure.

Moreover, an embodiment of the present disclosure further provides another one-key switch mode in a switching principle as illustrated in FIG. 11. When the display device in an input mode of some external device receives a switching instruction, the process jumps directly to the input mode of another external device or the display device in a preset order. When some input mode is not available, alert information will be given while disabling the non-available input mode.

Upon reception of a power-off/standby command in the input mode of the external device, whether the host or the external device is powered off/on standby will be indicated, and if the host is powered off, then firstly the external device and then the host will be powered off/on standby; and if the external device is powered off, then the process will return to the information preview picture, after the external device is powered off.

As can be apparent from the present disclosure above, an embodiment of the present disclosure may apply the private protocol mechanism via the interface, encapsulate the data at the application layer, transmit the control information over the dedicated link set up via the user interface, to enable shared control between the display device and the external device, and also exchange the operating state information and other information over the dedicated link. Moreover, an embodiment of the present disclosure further provide the television live function, the interaction and control management functions of the external device, and the information management function, the background service management function and the power supply management function of the display device and the external device, etc., so that the display device according to an embodiment of the present disclosure is provided with the mechanism to share both the resources and the information, to thereby greatly improve the efficiency of communication between the display device and the external device, provide the more flexible control mode and a larger number of application scenarios, and also enable the background state monitor and service functions.

Figure 12:
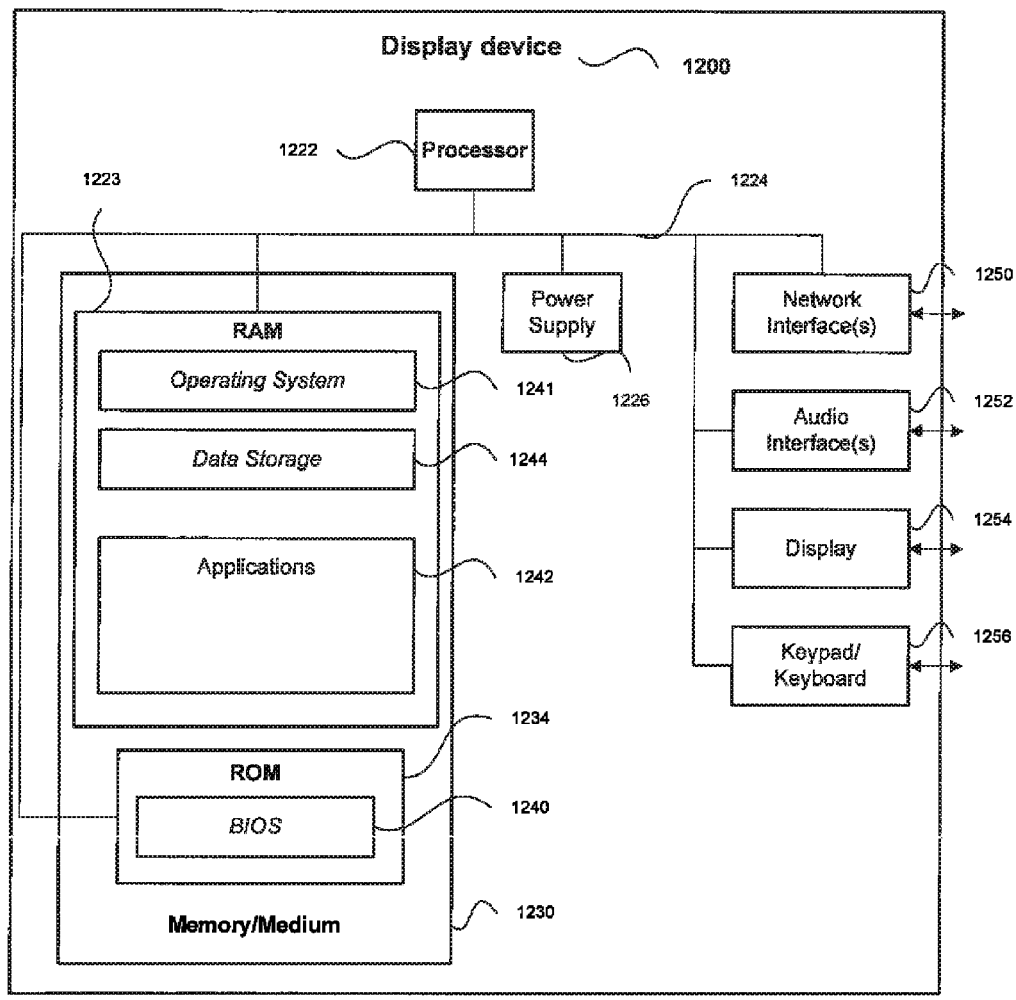
FIG. 12 illustrates a schematic diagram of an exemplary embodiment of a display device.

FIG. 12 is a schematic diagram illustrating an exemplary embodiment of a display device. The display device may include apparatuses to execute methods and software systems introduced in the present disclosure. A display device 1200 may be a computing device capable of executing a software system. The display device 1200 may, for example, be a device such as a smart TV, a personal desktop computer or a portable device, such as a laptop computer, a tablet computer, a cellular telephone, or a smart phone.

The display device 1200 may vary in terms of capabilities or features. Claimed subject matter is intended to cover a wide range of potential variations. For example, the display device 1200 may include a network interface 1250, an audio interface 1252, and a keypad/keyboard 1256. It may also include a display 1254, such as a liquid crystal display (LCD), or a display with a high degree of functionality, such as a touch-sensitive color 2D or 3D display. In contrast, however, as another example, a web-enabled display device 1200 may include one or more physical or virtual keyboards, and mass storage medium 1230.

The display device 1200 may also include or may execute a variety of operating systems 1241, including an operating system. The display device 1200 may include or may execute a variety of possible applications 1242, such as an electronic game 1245. An application 1242 may enable communication with other devices via a network, such as communicating with another computer via a network for online.

Further, the display device 1200 may include one or more non-transitory processor-readable storage media 1230 and one or more processors 1222 in communication with the non-transitory processor-readable storage media 1230. For example, the non-transitory processor-readable storage media 1230 may be a RAM memory, flash memory, ROM memory, EPROM memory, EEPROM memory, registers, hard disk, a removable disk, a CD-ROM, or any other form of non-transitory storage medium known in the art. The one or more non-transitory processor-readable storage media 1230 may store sets of instructions, or units and/or modules that include the sets of instructions, for conducting operations and/or method steps described in the present disclosure. Alternatively, the units and/or modules may be hardware disposed in the display device 1200 configured to conduct operations and/or method steps described in the present disclosure. The one or more processors may be configured to execute the sets of instructions and perform the methods and/or operations in example embodiments of the present disclosure.

Merely for illustration, only one processor will be described in display devices that execute operations and/or method steps in the following example embodiments. However, it should be note that the display devices in the present disclosure may also include multiple processors, thus operations and/or method steps that are performed by one processor as described in the present disclosure may also be jointly or separately performed by the multiple processors. For example, if in the present disclosure a processor of a display device executes both step A and step B, it should be understood that step A and step B may also be performed by two different processors jointly or separately in the display device (e.g., the first processor executes step A and the second processor executes step B, or the first and second processors jointly execute steps A and B).

Those skilled in the art shall appreciate that the embodiments of the present disclosure may be embodied as a method, a system or a computer program product. Therefore the present disclosure may be embodied in the form of an all-hardware embodiment, an all-software embodiment or an embodiment of software and hardware in combination. Furthermore the present disclosure may be embodied in the form of a computer program product embodied in one or more computer useable storage mediums (including but not limited to a disk memory, a CD-ROM, an optical memory, etc.) in which computer useable program codes are contained.

The present disclosure has been described in a flow chart and/or a block diagram of the method, the device (system) and the computer program product according to the embodiments of the present disclosure. It shall be appreciated that respective flows and/or blocks in the flow chart and/or the block diagram and combinations of the flows and/or the blocks in the flow chart and/or the block diagram may be embodied in computer program instructions. These computer program instructions may be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions may also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions may also be loaded onto the computer or the other programmable data processing device so that a series of operational steps are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the present disclosure have been described, those skilled in the art benefiting from the underlying inventive concept may make additional modifications and variations to these embodiments. Therefore the appended claims are intended to be construed as encompassing the preferred embodiments and all the modifications and variations coming into the scope of the present disclosure.

Evidently those skilled in the art may make various modifications and variations to the present disclosure without departing from the spirit and scope of the present disclosure. Thus the present disclosure is also intended to encompass these modifications and variations thereto so long as the modifications and variations come into the scope of the claims appended to the present disclosure and their equivalents.

The invention claimed is:

1. A control method, the method comprising:
   receiving, by a display device, first data comprising a control instruction over a first dedicated link, wherein the first data is encapsulated at an application layer by a first external device, and matches a data protocol of the first dedicated link; and
   upon the control instruction being a control instruction directed to the display device, performing, by the display device, a corresponding operation according to the control instruction, and
   upon the control instruction being a control instruction directed to a second external device, transmitting, by the display device, the first data to the second external device over a second dedicated link, so that the second external device performs a corresponding operation according to the control instruction,
   wherein the first dedicated link is a link, between the display device and the first external device, set up through an interface component of the display device; and
   the second dedicated link is a link, between the display device and the second external device, set up through the interface component of the display device;
   wherein the method further comprises:
   receiving, by the display device, second data over the first dedicated link, wherein the second data is encapsulated by the first external device at the application layer and matches the data protocol of the first dedicated link, wherein the second data comprises operating state information of the first external device; and
   encapsulating, by the display device, operating state information of the display device into third data matching the data protocol of the first dedicated link at the application layer, and transmitting the third data to the first external device over the first dedicated link;
   wherein after receiving, by the display device, the second data over the first dedicated link, the method further comprises:
   transmitting, by the display device, the operating state information of the display device and the first external device to a background server;
   receiving, by the display device, a state adjustment instruction obtained by the background server, according to the operating state information of the display device and/or the first external device, wherein the state adjustment instruction includes an instruction to reconfigure the display device and/or the first external device, or an instruction to push a service of interest from the display device and/or the first external device; and
   performing a corresponding operation according to the state adjustment instruction.

2. The method according to claim 1, wherein before transmitting, by the display device, the first data to the second external device over the second dedicated link, the method further comprises:
   upon the display device determines that the first data does not match a data protocol of the second dedicated link, encapsulating the first data into data matching the data protocol of the second dedicated link at the application layer.

3. The method according to claim 1, wherein the method further comprises:
  obtaining, by the display device, identification information of the first external device and determining whether the identification information is present in a database of the display device; and
  upon the identification information is present in the database of the display device, then searching, by the display device, the database for remote control information of the first external device corresponding to the identification information, and creating a mapping relationship between the remote control information of the first external device and remote control information of the display device, and
  upon the identification information is absent in the database of the display device, then retrieving, by the display device, remote control information of the first external device, and binding the remote control information to the identification information and then storing it in the database, and creating a mapping relationship between the remote control information of the first external device and remote control information of the display device.

4. The method according to claim 3, wherein after creating, by the display device, the mapping relationship between the remote control information of the first external device and remote control information of the display device, the method further comprises:
  determining, by the display device, the remote control information of the first external device corresponding to the received remote control information of the display device, according to the mapping relationship, upon determining that the first external device needs to be controlled remotely;
  encapsulating, by the display device, the remote control information of the first external device into fourth data matching the data protocol of the first dedicated link at the application layer; and
  transmitting, by the display device, the fourth data to the first external device over the first dedicated link, so that the first external device performs a corresponding operation according to the remote control information of the first external device.

5. A display device, comprising:
  an interface component configured to receive first data comprising a control instruction over a first dedicated link, wherein the first data is encapsulated at an application layer by a first external device, and matches a data protocol of the first dedicated link; and when the control instruction is a control instruction directed to a second external device, to transmit the first data to the second external device over a second dedicated link, wherein the first dedicated link is a link, between the display device and the first external device, set up through the interface component, and the second dedicated link is a link, between the display device and the second external device, set up through the interface component; and
  a processor configured to perform a corresponding operation according to the control instruction, after the control instruction is determined to be a control instruction directed to the display device; and
  a display screen;
  wherein the interface component is further configured:
  to receive second data, encapsulated by the first external device at the application layer, matching the data protocol of the first dedicated link over the first dedicated link, wherein the second data comprises operating state information of the first external device; and to transmit third data to the first external device over the first dedicated link; and
  the processor is further configured:
  to encapsulate operating state information of the display device into the third data matching the data protocol of the first dedicated link at the application layer;
  wherein the interface component is further configured:
  upon reception of the second data, encapsulated by the first external device at the application layer, matching the data protocol of the first dedicated link over the first dedicated link, to transmit the operating state information of the display device and the first external device to a background server; and to receive a state adjustment instruction obtained by the background server, according to the operating state information of the display device and/or the first external device, wherein the state adjustment instruction includes an instruction to re-configure the display device and/or the first external device, or an instruction to push a service of interest from the display device and/or the first external device, and
  the processor is further configured:
  to perform a corresponding operation in according to the state adjustment instruction.

6. The display device according to claim 5, wherein the first data is data, comprising the control instruction, encapsulated at the application layer by the first external device, matching the data protocol of the first dedicated link.

7. The display device according to claim 5, wherein the processor is further configured:
  before the first data is transmitted to the second external device over the second dedicated link, if the display device determines that the first data does not match a data protocol of the second dedicated link, to encapsulate the first data into data matching the data protocol of the second dedicated link at the application layer.

8. The display device according to claim 5, wherein the interface component is further configured:
  to obtain identification information of the first external device, and to obtain remote control information of the first external device, upon determining that the identification information is present in a database of the display device; and
  the processor is further configured:
  to determine whether the identification information is present in the database of the display device; and
  upon the identification information is present in the database of the display device, to search the database for remote control information of the first external device corresponding to the identification information, and to create a mapping relationship between the remote control information of the first external device and remote control information of the display device, and
  upon the identification information is absent in the database of the display device, to obtain remote control information of the first external device, and then bind the remote control information to the identification information and store it in the database, and to create a mapping relationship between the remote control information of the first external device and remote control information of the display device.

9. The display device according to claim 8, wherein the processor is further configured:
  after the mapping relationship is created between the remote control information of the first external device and the remote control information of the display device, and the first external device is determined to be controlled remotely, to determine the remote control information of the first external device corresponding to the received remote control information of the display device, according to the mapping relationship; and to encapsulate the remote control information of the first external device into fourth data matching the data protocol of the first dedicated link at the application layer; and the interface component is further configured:

to transmit the fourth data to the first external device over the first dedicated link, so that the first external device performs a corresponding operation according to the remote control information of the first external device.

10. A control method, the method comprising:

receiving, by a display device, first data, comprising a control instruction, transmitted by a first external device; and upon the control instruction is a control instruction directed to the display device, then executing, by the display device, the control instruction, and upon the control instruction is a control instruction directed to a second external device, then transmitting, by the display device, the first data to the second external device;

wherein the display device further receives second data, comprising operating state information of the first external device, transmitted by the first external device; and the display device further transmits third data comprising operating state information of the display device to the first external device;

wherein after receiving, by the display device, the second data, the method further comprises:

transmitting, by the display device, the operating state information of the display device and the first external device to a background server;

receiving by the display device, a state adjustment instruction obtained by the background server according to the operating state information of the display device and' or the first external device, wherein the state adjustment instruction includes an instruction to re-configure the display device and/or the first external device, or an instruction to push a service of interest from the display device and/or the first external device; and performing a corresponding operation the state according to the state adjustment instruction.

11. The method according to claim 10, wherein the display device receives the first data, over a first dedicated link between the display device and the first external device.

12. The method according to claim 10, wherein the display device transmits the first data to the second external device, over a second dedicated link between the display device and the second external device.

13. The method according to claim 10, wherein the first data is data encapsulated at an application layer.

* * * * *